(12) United States Patent
Liu

(10) Patent No.: US 10,157,811 B2
(45) Date of Patent: *Dec. 18, 2018

(54) CHIP PACKAGE AND METHOD FOR FORMING THE SAME

(71) Applicant: XINTEC INC., Taoyuan (TW)

(72) Inventor: Chien-Hung Liu, New Taipei (TW)

(73) Assignee: XINTEC INC., Taoyuan (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/618,054

(22) Filed: Jun. 8, 2017

(65) Prior Publication Data

US 2017/0278769 A1  Sep. 28, 2017

Related U.S. Application Data

(63) Continuation of application No. 15/008,241, filed on Jan. 27, 2016, now Pat. No. 9,704,772, which is a
(Continued)

(30) Foreign Application Priority Data

Apr. 2, 2014 (TW) .............................. 103112268 A
Aug. 19, 2014 (TW) .............................. 103128390 A

(51) Int. Cl.
*H01L 23/31* (2006.01)
*H01L 23/29* (2006.01)
(Continued)

(52) U.S. Cl.
CPC ...... *H01L 23/3192* (2013.01); *G01L 19/0061* (2013.01); *G01L 19/06* (2013.01);
(Continued)

(58) Field of Classification Search
CPC ............. H01L 23/3114; H01L 23/3171; H01L 23/3185; H01L 23/3192
See application file for complete search history.

(56) References Cited

U.S. PATENT DOCUMENTS 9,704,772 B2 * 7/2017 Liu .................... H01L 23/3192
2004/0222440 A1 11/2004 Pendse et al.
(Continued)

FOREIGN PATENT DOCUMENTS

CN 104201115 12/2014
TW 201027641 7/2010
(Continued)

*Primary Examiner* — Cuong Q Nguyen
(74) *Attorney, Agent, or Firm* — Liu & Liu

(57) ABSTRACT

A chip package includes a chip, a dam layer, a permanent adhesive layer, a support, a buffer layer, a redistribution layer, a passivation layer, and a conducting structure. A conducting pad and a sensing device of the chip are located on a first surface of a substrate of the chip, and the conducting pad protrudes from the side surface of the substrate. The dam layer surrounds the sensing device. The permanent adhesive layer is between the support and the substrate. The support and the permanent adhesive layer have a trench to expose the conducting pad. The buffer layer is located on the support. The redistribution layer is located on the buffer layer and on the support, the permanent adhesive layer, and the conducting pad facing the trench. The passivation layer covers the redistribution layer, the buffer layer, and the conducting pad.

16 Claims, 13 Drawing Sheets

Related U.S. Application Data continuation-in-part of application No. 14/676,671, filed on Apr. 1, 2015, now Pat. No. 9,337,115.

(60) Provisional application No. 62/116,763, filed on Feb. 16, 2015.

(51) Int. Cl.

| | | |
|---|---|---|
| *H01L 21/56* | (2006.01) | |
| *H05K 1/18* | (2006.01) | |
| *H05K 1/02* | (2006.01) | |
| *H05K 1/11* | (2006.01) | |
| *H05K 3/32* | (2006.01) | |
| *G06K 9/00* | (2006.01) | |
| *G01L 19/14* | (2006.01) | |
| *G06F 21/32* | (2013.01) | |
| *H01L 21/02* | (2006.01) | |
| *G01L 19/00* | (2006.01) | |
| *G01L 19/06* | (2006.01) | |
| *H01L 23/525* | (2006.01) | |
| *H01L 21/60* | (2006.01) | |

(52) U.S. Cl.
CPC .............. *G01L 19/14* (2013.01); *G06F 21/32* (2013.01); *G06K 9/00* (2013.01); *G06K 9/00006* (2013.01); *H01L 21/0212* (2013.01); *H01L 21/02263* (2013.01); *H01L 21/56* (2013.01); *H01L 23/291* (2013.01); *H01L 23/3114* (2013.01); *H01L 23/3185* (2013.01); *H05K 1/0298* (2013.01); *H05K 1/111* (2013.01); *H05K 1/181* (2013.01); *H05K 3/32* (2013.01); *H01L 23/525* (2013.01); *H01L 2021/60022* (2013.01); *H01L 2224/11* (2013.01)

(56) References Cited

U.S. PATENT DOCUMENTS

| | | |
|---|---|---|
| 2005/0009238 A1 | 1/2005 | Okigawa |
| 2008/0111228 A1 | 5/2008 | Yu et al. |
| 2008/0164550 A1 | 7/2008 | Chen et al. |
| 2014/0084458 A1 | 3/2014 | Huang et al. |

FOREIGN PATENT DOCUMENTS

| | | |
|---|---|---|
| TW | 201135922 | 10/2011 |
| TW | 201448188 | 12/2014 |
| WO | 2013/097581 | 7/2013 |

\* cited by examiner

CHIP PACKAGE AND METHOD FOR FORMING THE SAME

CROSS REFERENCE TO RELATED APPLICATIONS

This application is a continuation of U.S. application Ser. No. 15/008,241, filed Jan. 27, 2016, which claims priority to U.S. Provisional Application Ser. No. 62/116,763, filed on Feb. 16, 2015, and is a Continuation-in-part of U.S. application Ser. No. 14/676,671, filed on Apr. 1, 2015, which claims priority of Taiwan Patent Application Serial Number 103112268, filed on Apr. 2, 2014, and priority of Taiwan Patent Application Serial Number 103128390, filed on Aug. 19, 2014, all of which are herein incorporated by reference.

BACKGROUND OF THE INVENTION

Field of the Invention

The invention relates to chip packaging technology, and in particular to a chip package and methods for forming the same.

Description of the Related Art

The chip packaging process is an important step in the fabrication of an electronic product. Chip packages not only protect the chips therein from outer environmental contaminants, but they also provide electrical connection paths between electronic elements inside and those outside of the chip packages.

When an electronic product with touch-screen function is used by the users, vapor or oil tends to remain on the electronic product. The sensing device of the chip package in the electronic product is contaminated and physically damaged when the users use the electronic product, thereby reducing the reliability and lifetime of the electronic product.

Thus, there exists a need in the art for development of a chip package and methods for forming the same capable of mitigating or eliminating the aforementioned problems.

A conventional chip package includes a chip and a conductive wire. The chip has a conducting pad and a silicon substrate. The conductive wire may be electrically connected to the conducting pad and a printed circuit board through a wire-bonding process. However, the cost of the wire-bonding process is high, and the conductive wire occupies space. Hence, in recent years, the chip package is often manufactured by chip scale package (CSP) technology. After a ball grid array (BGA) is formed on the back surface of the chip, the chip is bonded to the printed circuit board.

Nevertheless, due to process limitations, the silicon substrate having sufficient thickness is required to prevent the chip package from being broken and damaged in manufacturing. As a result, the material cost of the chip package is increased. Moreover, the capacitance of the conventional chip package easily decays to affect the sensing capability of the chip package, such as a sensing capability for fingerprint pressure.

BRIEF SUMMARY OF THE INVENTION

An embodiment of the invention provides a chip package comprising a substrate having a first surface and a second surface opposite thereto. The substrate comprises a sensing device and at least one conducting pad therein, and the sensing device and the conducting pad are adjacent to the first surface. The conducting pad has a sidewall laterally protruding from a sidewall of the substrate. An encapsulation layer is attached to the first surface of the substrate to cover the sensing device and the conducting pad. A redistribution layer is disposed on the second surface of the substrate and extends to contact the sidewall of the conducting pad. An end of the redistribution layer protrudes from the first surface of the substrate and is aligned with a third surface of the encapsulation layer that is opposite to the first surface of the substrate.

An embodiment of the invention provides a method for forming a chip package comprising providing a substrate. The substrate has a first surface and a second surface opposite thereto. The substrate comprises a sensing device and at least one conducting pad therein, and the sensing device and the conducting pad are adjacent to the first surface. The conducting pad has a sidewall laterally protruding from a sidewall of the substrate. An encapsulation layer is attached to the first surface of the substrate to cover the sensing device and the conducting pad. A redistribution layer is formed on the second surface of the substrate. The redistribution layer extends to contact the sidewall of the conducting pad. An end of the redistribution layer protrudes from the first surface of the substrate and is aligned with a third surface of the encapsulation layer that is opposite to the first surface of the substrate.

An aspect of the present invention is to provide a chip package.

According to an embodiment of the present invention, a chip package includes a chip, a dam layer, a permanent adhesive layer, a support, a buffer layer, a redistribution layer, a passivation layer, and a conducting structure. The chip has a substrate, a conducting pad, and a sensing device. The substrate has a side surface, a first surface, and a second surface opposite to the first surface. The side surface is connected to the first and second surfaces. The conducting pad and the sensing device are located on the first surface. The conducting pad protrudes from the side surface. The dam layer is located on the first surface and surrounds the sensing device. The permanent adhesive layer covers the second surface, the side surface, and the conducting pad that protrudes the side surface. The permanent adhesive layer is between the support and the substrate. The support and the permanent adhesive layer have a trench, such that the conducting pad protruding the side surface is exposed through the trench. The buffer layer is located on the support. The redistribution layer is located on the buffer layer and on the support, the permanent adhesive layer, and the conducting pad that face the trench. The passivation layer covers the redistribution layer, the buffer layer, and the conducting pad that is exposed through the trench. The passivation layer has an opening to expose the redistribution layer. The conducting structure is located on the redistribution layer that is in the opening of the passivation layer.

Another aspect of the present invention is to provide a manufacturing method of a chip package.

According to an embodiment of the present invention, a manufacturing method of a chip package includes the following steps. A dam layer is formed on a conducting pad of a wafer, and the dam layer surrounds a sensing device of the wafer. A temporary adhesive layer is utilized to bond a carrier to the dam layer. A substrate of the wafer is etched, such that the conducting pad protrudes from a side surface of the substrate. A permanent adhesive layer is utilized to bond a support to the wafer, such that the permanent adhesive layer is between the support and the substrate. A buffer layer is formed on the support. A trench is formed in the buffer layer, the support, and the permanent adhesive layer, thereby exposing the conducting pad that protrudes from the side surface of the substrate. A redistribution layer is formed on the buffer layer and on the support, the permanent adhesive layer, and the conducting pad that face the trench. A passivation layer is formed to cover the redistribution layer, the buffer layer, and the conducting pad that is exposed through the trench, and the passivation layer has an opening. A conducting structure is formed on the redistribution layer that is in the opening of the passivation layer.

In the aforementioned embodiments of the present invention, the temporary adhesive layer is utilized to bond the carrier to the dam layer in manufacturing the chip package. The carrier can provide support strength to the chip, thereby preventing the chip package from being broken and damaged in the manufacturing process. As a result, the yield rate of the chip package may be improved. In addition, since the carrier is bonded to the dam layer, a thin substrate may be selected to manufacture the chip package. Therefore, the material cost of the chip package may be reduced, and the convenience of designing the chip package may be improved. Before a cutting process for the chip package is utilized, processes performed on the wafer are with a wafer level, so that the manufacturing cost of the chip package is lower than a conventional wire-bonding process. Moreover, after the cutting process, the chip package is a chip scale package (CSP), thereby facilitating the miniaturization design of the chip package.

A detailed description is given in the following embodiments with reference to the accompanying drawings. It is to be understood that both the foregoing general description and the following detailed description are by examples, and are intended to provide further explanation of the invention as claimed.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the present disclosure are discussed in detail below. However, it should be noted that the embodiments provide many applicable inventive concepts that can be embodied in a variety of specific methods. The specific embodiments discussed are merely illustrative of specific methods to make and use the embodiments, and do not limit the scope of the disclosure. The disclosed contents of the present disclosure include all the embodiments derived from claims of the present disclosure by those skilled in the art. In addition, the present disclosure may repeat reference numbers and/or letters in the various embodiments. This repetition is for the purpose of simplicity and clarity, and does not imply any relationship between the different embodiments and/or configurations discussed. Furthermore, when a first layer is referred to as being on or overlying a second layer, the first layer may be in direct contact with the second layer, or spaced apart from the second layer by one or more material layers.

A chip package according to an embodiment of the present invention may be used to package micro-electro-mechanical system chips. However, embodiments of the invention are not limited thereto. For example, the chip package of the embodiments of the invention may be implemented to package active or passive elements or electronic components of integrated circuits, such as digital or analog circuits. For example, the chip package may be related to optoelectronic devices, micro-electro-mechanical systems (MEMS), biometric devices, microfluidic systems, and physical sensors measuring changes to physical quantities such as heat, light, capacitance, pressure, and so on. In particular, a wafer-level packaging (WSP) process may optionally be used to package semiconductor chips, such as image-sensor elements, light-emitting diodes (LEDs), solar cells, RF circuits, accelerators, gyroscopes, fingerprint recognition devices, micro actuators, surface acoustic wave devices, pressure sensors, ink printer heads, and so on.

The above-mentioned wafer-level packaging process mainly means that after the packaging step is accomplished during the wafer stage, the wafer with chips is cut to obtain individual packages. However, in a specific embodiment, separated semiconductor chips may be redistributed on a carrier wafer and then packaged, which may also be referred to as a wafer-level packaging process. In addition, the above-mentioned wafer-level packaging process may also be adapted to form a chip package having multi-layer integrated circuit devices by stacking a plurality of wafers having integrated circuits.

Figure 1A:
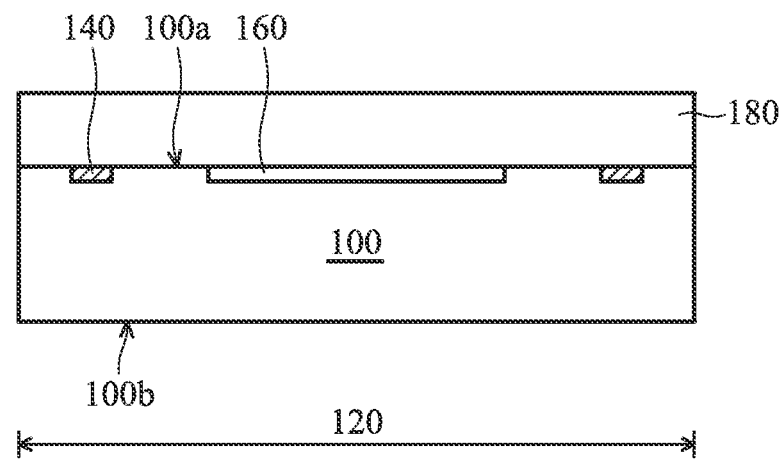
FIGS. 1A to 1G are cross-sectional views of an exemplary embodiment of a method for forming a chip package according to the invention.
Figure 1B:
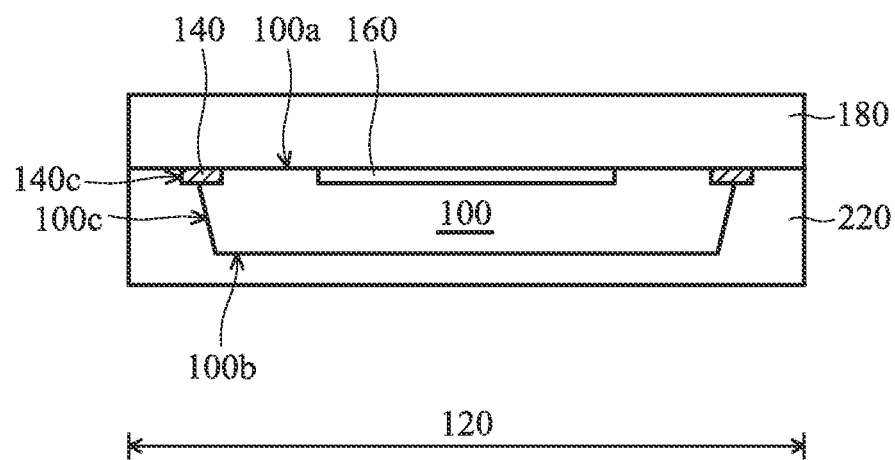
Figure 1C:
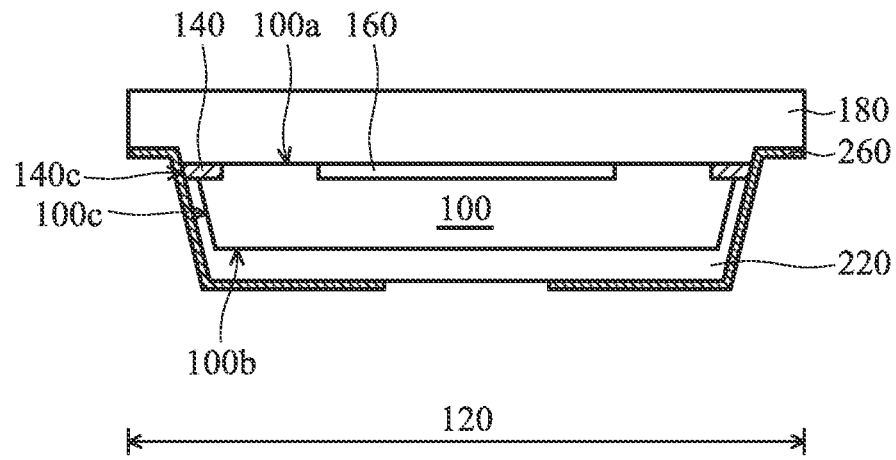
Figure 1D:
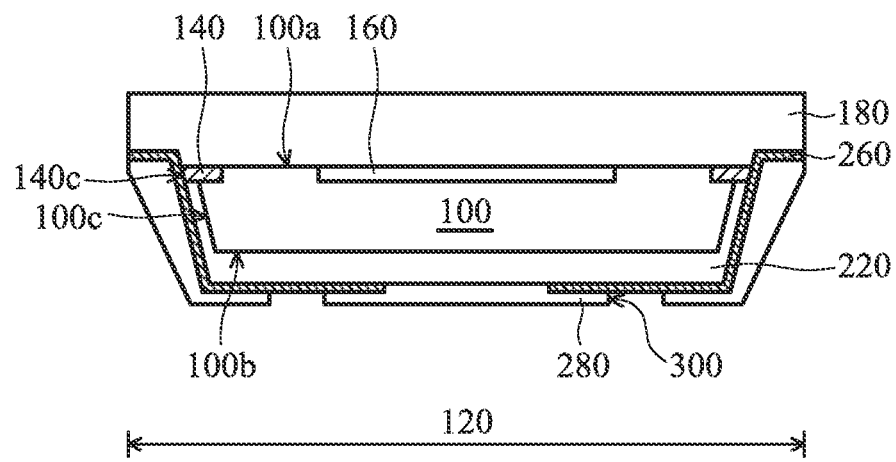
Figure 1E:
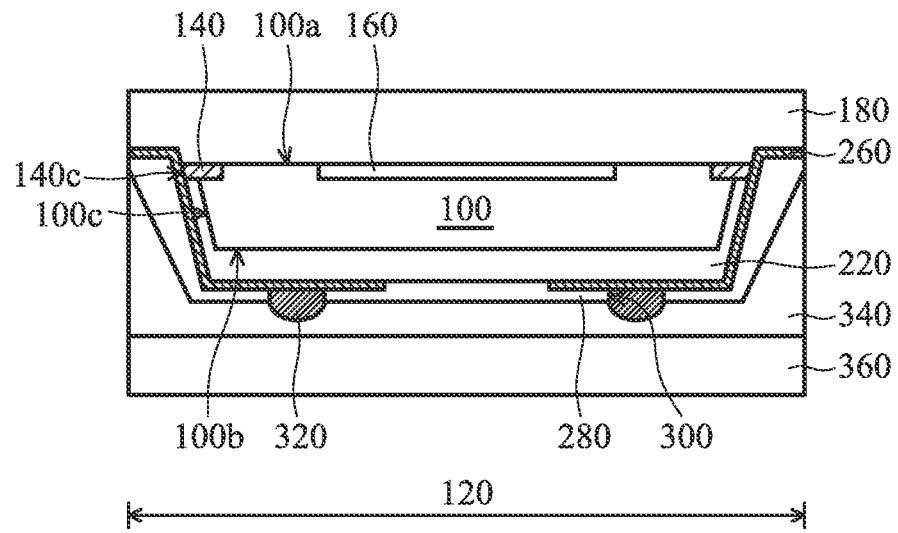
Figure 1F:
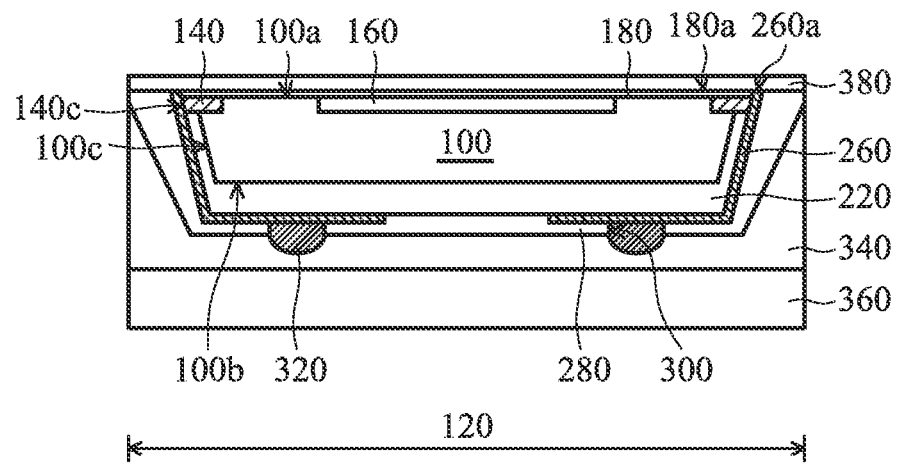
Figure 1G:
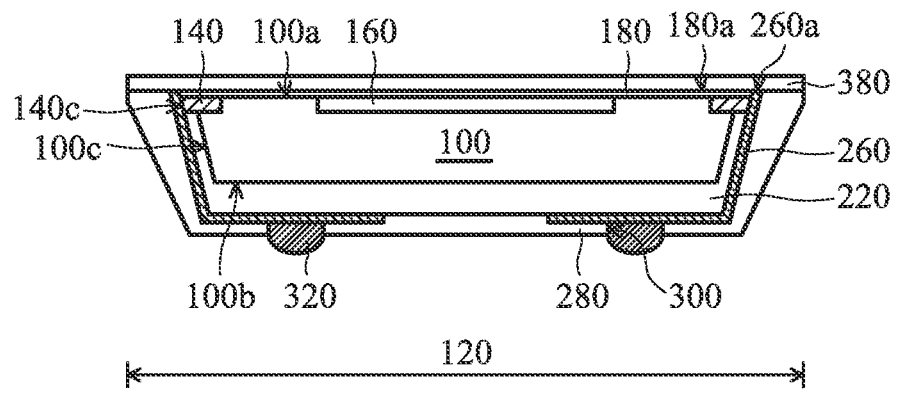

Referring to FIG. 1G, a cross-sectional view of an exemplary embodiment of a chip package according to the invention is illustrated. In the embodiment, the chip package comprises a substrate 100, an encapsulation layer 180 and a redistribution (RDL) layer 260. The substrate 100 has a first surface 100a, a second surface 100b opposite to the first surface 100a, and a sidewall 100c. In one embodiment, the substrate 100 may be a silicon substrate or another semiconductor substrate.

In the embodiment, the substrate 100 has a sensing device 160 and one or more conducting pads 140. The sensing device 160 and the conducting pads 140 may be adjacent to the first surface 100a. In one embodiment, the sensing device 160 is configured to sense biometrics, and may comprise a fingerprint-recognition element. In another embodiment, the sensing device 160 is configured to sense environmental characteristics, and may comprise a temperature-sensing element, a humidity-sensing element, a pressure-sensing element, a capacitance-sensing element, or another suitable sensing element. In one embodiment, a sensing element in the sensing device 160 may be electrically connected to the conducting pads 140 through an interconnection structure (not shown) in the substrate 100.

In the embodiment, each conducting pad 140 has a sidewall 140c laterally protruding from the sidewall 100c of the substrate 100. In one embodiment, the conducting pad 140 may be a single conducting layer or comprise multiple conducting layers. To simplify the diagram, only a single conducting layer is depicted as an example and only two conducting pads 140 within the substrate 100 are depicted herein.

The encapsulation layer 180 is attached to the first surface 100a of the substrate 100 to cover the sensing device 160 and the conducting pads 140. In the embodiment, a sidewall of the encapsulation layer 180 is aligned with the sidewall 140c of the conducting pad 140. In one embodiment, the thickness of the encapsulation layer 180 may be approximately 3 μm to 30 μm (such as 25 μm). In the embodiment, the encapsulation layer 180 may comprise epoxy resin, inorganic materials (such as silicon oxide, silicon nitride, silicon oxynitride, metal oxide or a combination thereof), organic polymer materials (such as polyimide, butylcyclobutene (BCB), parylene, polynaphthalenes, fluorocarbons or acrylates) or another suitable insulating material.

An insulating layer 220 is disposed on the second surface 100b of the substrate 100. The insulating layer 220 extends along the sidewalls 100c of the substrate 100 to cover a portion of the conducting pads 140, which laterally protrudes from the substrate 100. In the embodiment, the insulating layer 220 may comprise epoxy resin, inorganic materials (such as silicon oxide, silicon nitride, silicon oxynitride, metal oxide or a combination thereof), organic polymer materials (such as polyimide, butylcyclobutene (BCB), parylene, polynaphthalenes, fluorocarbons or acrylates) or another suitable insulating material.

The redistribution layer 260 is disposed on the insulating layer 220 on the second surface 100b of the substrate 100. The redistribution layer 260 conformally extends to the sidewalls of the encapsulation layer 180 and is in direct contact with the sidewall 140c of the conducting pad 140. Therefore, the redistribution layer 260 forms a T-contact electrically connected to the corresponding conducting pad 140, and the redistribution layer 260 is electrically isolated from the substrate 100 through the insulating layer 220. In the embodiment, an end 260a of the redistribution layer 260 protrudes from the first surface 100a of the substrate 100 and is aligned with a third surface 180a of the encapsulation layer 180, which is opposite to the first surface 100a of the substrate 100. In one embodiment, the redistribution layer 260 may comprise copper, aluminum, gold, platinum, nickel, tin, a combination thereof or another suitable conductive material. In another embodiment, the redistribution layer 260 may comprise a conductive polymer material or a conductive ceramic material (such as indium tin oxide or indium zinc oxide).

In the embodiment, the chip package further comprises a protection layer 380 disposed on the first surface 100a of the substrate 100 to cover the encapsulation layer 180 and the end 260a of the redistribution layer 260. In one embodiment, the hardness of the protection layer 380 is greater than that of the encapsulation layer 180. For example, the hardness of the protection layer 380 is greater than Mohs hardness of 7H. In another embodiment, the protection layer 380 comprises a material with high erosion-resistant. Yet another embodiment, the protection layer 380 comprises a material capable of blocking vapor. In one embodiment, the thickness of the protection layer 380 may be in a range of about 30 μm to about 40 μm.

In the embodiment, the chip package further comprises a passivation layer 280 and a plurality of conducting structures 320. The passivation layer 280 and the conducting structures 320 are disposed on the second surface 100b of the substrate 100.

The passivation layer 280 is disposed on the insulating layer 220 and the redistribution layer 260, and covers a portion of the protection layer 380. In the embodiment, the passivation layer 280 has a surface aligned with the third surface 180a of the encapsulation layer 180. The passivation layer 280 has a plurality of openings 300 to expose a corresponding portion of the redistribution layer 260, which is located on the second surface 100b of the substrate 100. In the embodiment, the passivation layer 280 may comprise epoxy resin, solder mask, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates), photoresist materials, or another suitable insulating material.

The conducting structures 320 are correspondingly disposed within the openings 300 of the passivation layer 280 to directly contact the exposed portions of the redistribution layer 260 and electrically connect to the redistribution layer 260. In the embodiment, the conducting structures 320 may be solder balls, bumps, conductive pillars, or another suitable conducting structure. The conducting structures 320 may comprise tin, lead, copper, gold, nickel, a combination thereof, or another suitable conductive material.

Figure 2:
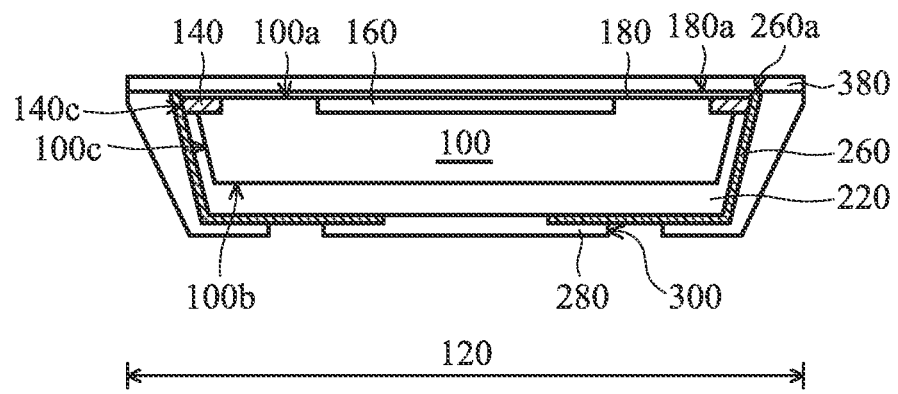
FIG. 2 is a cross-sectional view of another exemplary embodiment of a chip package according to the invention.
Figure 3A:
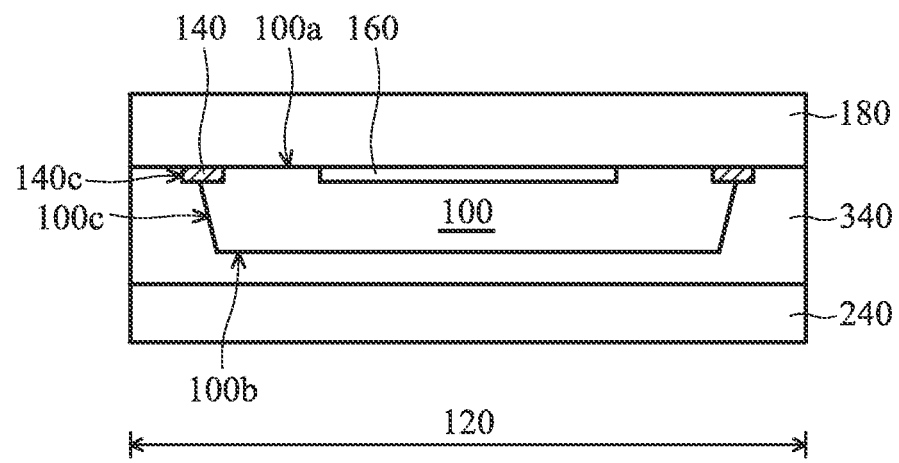
FIGS. 3A to 3D are cross-sectional views of another exemplary embodiment of a method for forming a chip package according to the invention.
Figure 3B:
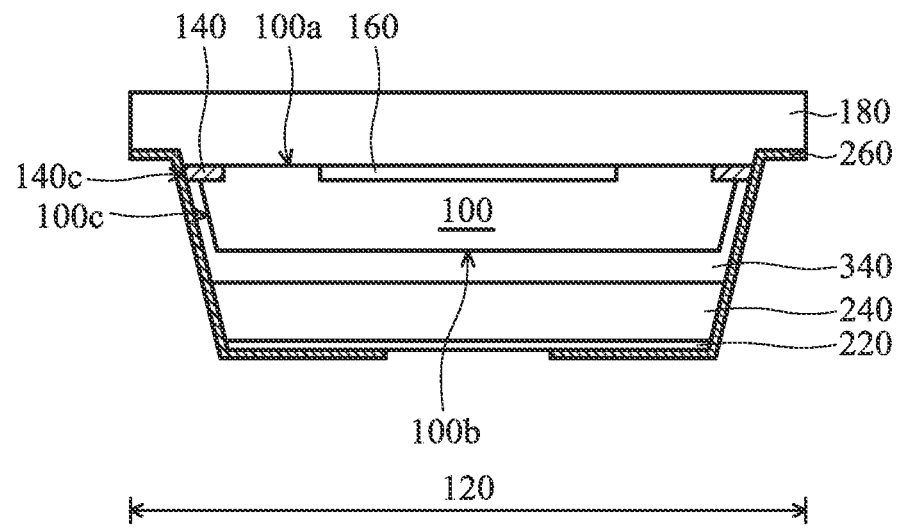
Figure 3C:
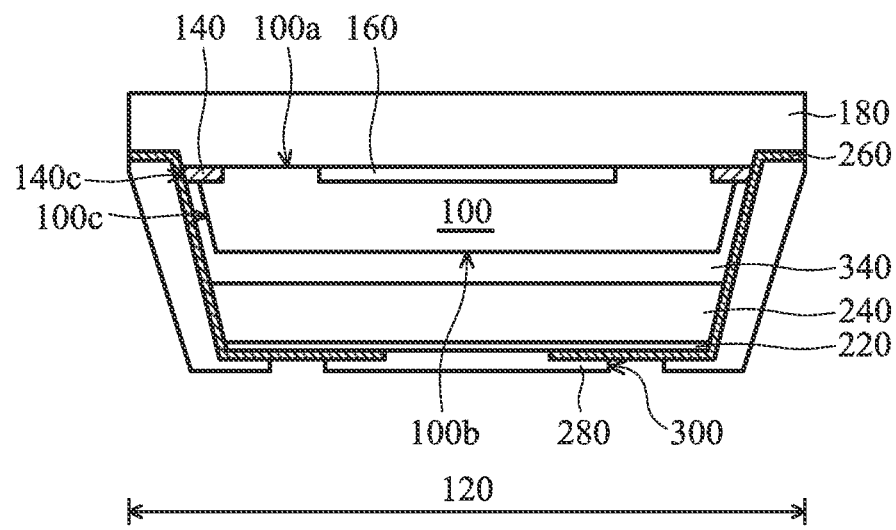
Figure 3D:
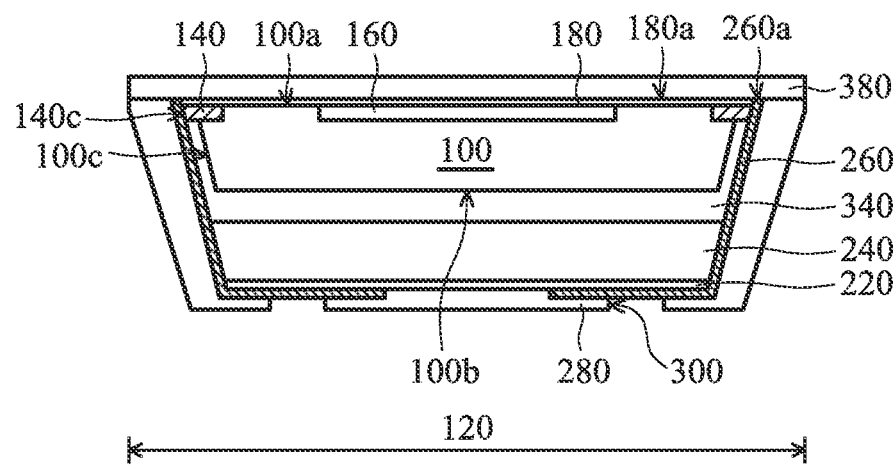

FIGS. 2 and 3D are cross-sectional views of various exemplary embodiments of a chip package according to the invention, wherein elements in FIGS. 2 and 3D that are the same as those in FIG. 1G are labeled with the same reference numbers as in FIG. 1G and are not described again for brevity. The chip package structure shown in FIG. 2 is similar to that shown in FIG. 1G. The difference therebetween is that a ball grid array (BGA) is formed of the conducting structures 320 in the openings 300 of the passivation layer 280 to serve as external conducting structures of the chip package shown in FIG. 1G. A land grid array (LGA) is formed of the redistribution layer 260 exposed by the openings 300 of the passivation layer 280 to serve as external conducting structures of the chip package shown in FIG. 2.

The chip package structure shown in FIG. 3D is similar to that shown in FIG. 2. The difference therebetween is that not only the insulating layer 220 but also a support substrate 240 and an adhesive layer 340 are disposed between the substrate 100 and the redistribution layer 260, as shown in FIG. 3D. The support substrate 240 is attached to the second surface 100b of the substrate 100 through the adhesive layer 340. In one embodiment, the support substrate 240 may comprise glass, silicon, a plastic film, sapphire, or another suitable support material.

In the embodiment, the adhesive layer 340 extends along the sidewalls 100c of the substrate 100 and covers a portion of the conducting pads 140, which laterally protrudes from the substrate 100. In one embodiment, the adhesive layer 340 may comprise adhesive glue, a tape, wax or another suitable adhesive material.

In the embodiment, the insulating layer 220 is located between the support substrate 240 and the redistribution layer 260 without extending along the sidewall 100c of the substrate 100. Furthermore, the redistribution layer 260 conformally extends along the sidewalls of the insulating layer 220, the support substrate 240, and the adhesive layer 340 onto the sidewall of the encapsulation layer 180. The redistribution layer 260 is in direct contact with the sidewall 140c of the conducting pad 140 and is electrically isolated from the substrate 100 through the adhesive layer 340.

According to the aforementioned embodiments, a T-contact, rather than wires (such as gold wires) and a lead frame, forms an external electrical connection path of the substrate having a sensing device. Therefore, the processing cost and the size of the chip package is reduced further. Furthermore, the protection layer on the sensing device of the chip package is formed of a material with high hardness, with high erosion-resistant, or capable of blocking vapor so as to protect the end of the redistribution layer, which is a portion of the T-contact, and the encapsulation layer having a relatively small thickness. This protection layer also provide a flat surface with wear-resistant, scratch proof, and high reliability above the sensing device to prevent the sensing device of the chip package from being contaminated or damaged when the sensing function of the chip package is used. Therefore, the reliability and quality of the chip package can be improved.

An exemplary embodiment of a method for forming a chip package according to the invention is illustrated with FIGS. 1A to 1G, wherein FIGS. 1A to 1G are cross-sectional views of an exemplary embodiment of a method for forming a chip package according to the invention.

Referring to FIG. 1A, a substrate 100 is provided. The substrate 100 has a first surface 100a and a second surface 100b opposite thereto. In one embodiment, the substrate 100 may be a silicon substrate or another semiconductor substrate. In another embodiment, the substrate 100 is a silicon wafer so as to facilitate the wafer-level packaging process. In the embodiment, the substrate 100 comprises a plurality of chip regions 120. To simplify the diagram, only one chip region 120 of the substrate 100 is depicted herein.

In the embodiment, the substrate 100 in each chip region 120 has a sensing device 160 and one or more conducting pads 140. The sensing device 160 and the conducting pads 140 may be adjacent to the first surface 100a. In one embodiment, the sensing device 160 is configured to sense biometrics, and may comprise a fingerprint-recognition element. In another embodiment, the sensing device 160 is configured to sense environmental characteristics, and may comprise a temperature-sensing element, a humidity-sensing element, a pressure-sensing element, a capacitance-sensing element, or another suitable sensing element. In one embodiment, a sensing element in the sensing device 160 may be electrically connected to the conducting pads 140 through an interconnection structure (not shown) in the substrate 100. In one embodiment, the conducting pad 140 may be a single conducting layer or comprise multiple conducting layers. To simplify the diagram, only a single conducting layer is depicted as an example and only two conducting pads 140 within one chip region 120 of the substrate 100 are depicted herein.

Next, an encapsulation layer 180 is attached to the first surface 100a of the substrate 100 by a molding process or a deposition process (such as a coating process, a physical vapor deposition process, a chemical vapor deposition process or another suitable process) to cover the sensing device 160 and the conducting pads 140. In the embodiment, the encapsulation layer 180 has a third surface 180a opposite to the first surface 100a of the substrate 100. In the embodiment, the encapsulation layer 180 may comprise epoxy resin, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates) or another suitable insulating material.

Referring to FIG. 1B, the encapsulation layer 180 is used as a support substrate and a thinning process (such as an etching process, a milling process, a mechanical grinding process, or a chemical mechanical polishing process) is performed on the substrate 100 so as to reduce the thickness of the substrate 100. Next, a portion of the substrate 100 is removed from the edge of the chip region 120 by lithography and etching processes (the etching process may comprise a dry etching process, a wet etching process, a plasma etching process, a reactive ion etching process or another suitable process), such that each conducting pad 140 has a sidewall 140c laterally protruding from a sidewall 100c of the substrate 100. For example, a portion of the substrate 100, which corresponds to a scribe line (not shown) between the adjacent chip regions 120, is removed to expose portions of the encapsulation layer 180 and the conducting pads 140, such that the portions of the substrate 100 in the adjacent chip regions 120 are separated from each other.

Next, an insulating layer 220 is conformally formed on the second surface 100b of the substrate 100 by a deposition process (such as a coating process, a physical vapor deposition process, a chemical vapor deposition process or another suitable process). The insulating layer 220 extends along the sidewalls 100c of the substrate 100 to cover a portion of the encapsulation layer 180 and an exposed portion of each conducting pad 140. In the embodiment, the insulating layer 220 may comprise epoxy resin, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates) or another suitable insulating material.

Referring to FIG. 1C, portions of the insulating layer 220 and the encapsulation layer 180 are removed by a notching process, an etching process or another suitable process to expose a sidewall 140c of each conducting pad 140. For example, portions of the insulating layer 220 and the encapsulation layer 180, which correspond to the scribe line (not shown) between the adjacent chip regions 120, are removed, such that the portions of the insulating layer 120 in the adjacent chip regions 120 are separated from each other.

Next, a patterned redistribution layer 260 is formed on the insulating layer 220 by a deposition process (such as a coating process, a physical vapor deposition process, a chemical vapor deposition process or another suitable process), lithography and etching processes. The redistribution layer 260 conformally extends onto the encapsulation layer 180 and is in direct contact with the sidewall 140c of the conducting pad 140. Therefore, the redistribution layer 260 forms a T-contact electrically connected to the corresponding conducting pad 140, and the redistribution layer 260 is electrically isolated from the substrate 100 through the insulating layer 220. In one embodiment, the redistribution layer 260 may comprise copper, aluminum, gold, platinum, nickel, tin, a combination thereof or another suitable conductive material. In another embodiment, the redistribution layer 260 may comprise a conductive polymer material or a conductive ceramic material (such as indium tin oxide or indium zinc oxide).

Referring to FIG. 1D, a passivation layer 280 is conformally formed on the insulating layer 220 and the redistribution layer 260 by a deposition process (such as a coating process, a physical vapor deposition process, a chemical vapor deposition process or another suitable process) to cover the redistribution layer 260. Subsequently, a plurality of openings 300 is formed inside of the passivation layer 280 in each chip region 120 by lithography and etching processes so as to expose portions of the redistribution layer 260 located on the second surface 100b of the substrate 100. In the embodiment, the passivation layer 280 may comprise epoxy resin, solder mask, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates), or another suitable insulating material. In another embodiment, the passivation layer 280 may comprise a photoresist material, and the openings 300 may be formed in the passivation layer 280 by exposure and developing processes.

Referring to FIG. 1E, a conducting structure 320 is formed in each opening 300 of the passivation layer 280. The conducting structures 320 directly contact the exposed portions of the redistribution layer 260 and electrically connect to the patterned redistribution layer 260. For example, solder may be formed in the openings 300 of the passivation layer 280 by a plating process, a screen printing process or another suitable process, and then a reflow process is performed to form the conducting structures 320, which are referred to as a ball grid array (BGA). In the embodiment, the conductive structure 320 may comprise tin, lead, copper, gold, nickel, a combination thereof, or another suitable conductive material.

In other embodiments, the ball grid array may be replaced by a land grid array (LGA), as shown in FIG. 2. In the embodiment of FIG. 2, there is no conducting structure formed in the openings 300 of the passivation layer 280, and the redistribution layer 260 is exposed. In the subsequent process, before an independent chip package is bonded to a circuit board, solder (such as a solder paste and a flux) is formed on the circuit board by surface mount technology (SMT) and then a reflow process is performed to form conducting structures corresponding to the openings 300 of the passivation layer 280. Next, the chip package is bonded to the circuit board, and the redistribution layer 260 in the chip package is electrically connected to the circuit board through these conducting structures.

Compared to forming the conducting structures 320 in the openings 300 of the passivation layer 280, forming the conducting structures corresponding to the openings 300 of the passivation layer 280 on the circuit board can reduce the amount of solder (such as the amount of the solder paste), thereby effectively reducing the processing cost. Furthermore, the height of the conducting structures formed on the circuit board is less than the height of the conducting structures 320. Accordingly, the overall size of the chip package and the circuit board is reduced. Subsequently, a temporary substrate 360 is bonded to the second surface 100b of the substrate 100 through an adhesive layer 340 to provide a flat surface and protect the conducting structures 320. In one embodiment, the adhesive layer 340 may comprise adhesive glue, a tape, wax or another suitable adhesive material. In one embodiment, the temporary substrate 360 may be a glass substrate, a silicon substrate, or another suitable substrate.

Referring to FIG. 1F, the temporary substrate 360 is used as a support structure and a grinding process (such as a mechanical grinding process) is performed on the encapsulation layer 180 so as to reduce the thickness of the encapsulation layer 180. For example, the encapsulation layer 180 may be ground until portions of the redistribution layer 260, which laterally extend on the passivation layer 280, are exposed, such that the portions of the encapsulation layer 180 in the adjacent chip regions 120 are separated from each other.

In the embodiment, the aforementioned grinding process further comprises removing the portions of the redistribution layer 260, which laterally extend on the passivation layer 280, to expose the passivation layer 280. As a result, the redistribution layer 260 has an end 260a protruding from the first surface 100a of the substrate 100, and the end 260a is aligned with the third surface 180a of the encapsulation layer 180. Moreover, the sidewall of the ground encapsulation layer 180 is aligned with the sidewall 140c of the conducting pad 140. A surface of the passivation layer 280 is aligned with the third surface 180a of the encapsulation layer 180. In one embodiment, the thickness of the ground encapsulation layer 180 may be approximately 3 µm to 30 µm (such as 25 µm).

Next, a protection layer 380 is formed on the third surface 180a of the encapsulation layer 180 by a deposition process (such as a coating process, a physical vapor deposition process, a chemical vapor deposition process or another suitable process) to cover the ground encapsulation layer 180 and the end 260a of the redistribution layer 260. In one embodiment, the hardness of the protection layer 380 is greater than that of the encapsulation layer 180. In another embodiment, the protection layer 380 comprises a material with high erosion-resistant. Yet another embodiment, the protection layer 380 comprises a material capable of blocking vapor. In one embodiment, the thickness of the protection layer 380 may be in a range of about 30 µm to about 40 µm.

Referring to FIG. 1G, after the adhesive layer 340 and the temporary substrate 360 are removed, the passivation layer 280 and the protection layer 380 are diced along the scribe line (not shown) between the adjacent chip regions 120 so as to form a plurality of independent chip packages.

According to the aforementioned embodiments, the encapsulation layer and the redistribution layer are ground until the portions of the encapsulation layer in the adjacent chip regions are separated from each other, and the portions of the redistribution layer laterally extending on the encapsulation/passivation layer are removed simultaneously. As a result, the thickness of the encapsulation layer can be as small as possible, thereby increasing the sensitivity of the sensing device under the encapsulation layer. Furthermore, forming the protection layer with high hardness and high erosion-resistant and capable of blocking vapor on the thinned encapsulation layer can protect the thinned encapsulation layer and the ends of the redistribution layer, which are exposed after the grinding process. This protection layer also provide a flat surface with wear-resistant, scratch proof, and high reliability on the sensing side of the chip package to prevent the sensing device from being contaminated or damaged when the sensing function of the chip package is used. Therefore, the reliability and quality of the chip package can be improved.

In addition, forming chip packages by the wafer-level packaging process can produce massive chip packages, thereby reducing the processing cost and time. Moreover, the encapsulation layer not only protects the underlying sensing device, but also serves as a carrier substrate providing support during the wafer-level packaging process.

FIGS. 3A to 3D are cross-sectional views of another exemplary embodiment of a method for forming a chip package according to the invention, wherein elements in FIGS. 3A to 3D that are the same as those in FIGS. 1A to 1G are labeled with the same reference numbers as in FIGS. 1A to 1G, and are not described again for brevity.

Referring to FIG. 3A, a substrate 100 and an encapsulation layer 180 as shown in FIG. 1A are provided. The substrate 100 is then thinned by a method similar to that shown in FIG. 1B and a portion of the substrate 100 is removed from the edge of the chip region 120 by lithography and etching processes, such that each conducting pad 140 has a sidewall 140c laterally protruding from a sidewall 100c of the substrate 100.

Subsequently, a support substrate 240 is attached to the second surface 100b of the substrate 100 through an adhesive layer 340. In one embodiment, the support substrate 240 may comprise glass, silicon, a plastic film, sapphire, or another suitable support material. In the embodiment, the adhesive layer 340 extends along the sidewall 100c of the substrate 100 to cover a portion of the conducting pads 140, which laterally protrudes from the substrate 100. In one embodiment, the adhesive layer 340 may comprise adhesive glue, a tape, wax or another suitable adhesive material.

Referring to FIG. 3B, an insulating layer 220 is formed on the support substrate 240 by a method similar to that shown in FIG. 1C. Next, portions of the insulating layer 220, the support substrate 240, the adhesive layer 340 and the encapsulation layer 180 are removed by a notching process or another suitable process, and a sidewall 140c of each conducting pad 140 is exposed. For example, portions of the insulating layer 220, the support substrate 240, the adhesive layer 340 and the encapsulation layer 180, which correspond to the scribe line (not shown) between the adjacent chip regions 120, are removed. As a result, the portions of the insulating layer 220, the support substrate 240 and the adhesive layer 340 in the adjacent chip regions 120 are separated from each other.

Next, a patterned redistribution layer 260 is formed on the insulating layer 220 by a method similar to that shown in FIG. 1C. The redistribution layer 260 conformally extends along the sidewalls of the insulating layer 220, the support substrate 240 and the adhesive layer 340 onto the encapsulation layer 180. The redistribution layer 260 is in direct contact with the sidewall 140c of the conducting pad 140. Therefore, the redistribution layer 260 forms T-contacts electrically connected to the corresponding conducting pads 140 and the redistribution layer 260 is electrically isolated from the substrate 100 through the adhesive layer 340.

Referring to FIG. 3C, a passivation layer 280 is conformally formed on the insulating layer 220 and the redistribution layer 260 by a method similar to that shown in FIG. 1D. The passivation layer 280 covers the redistribution layer 260. A plurality of openings 300 is formed inside of the passivation layer 280 in each chip region 120 by a method similar to that shown in FIG. 1D. Portions of the redistribution layer 260 located on the second surface 100b of the substrate 100 are exposed by the openings 300.

Referring to FIG. 3D, a grinding process is performed on the encapsulation layer 180 using a temporary substrate (not shown) as a support structure, and the portions of the redistribution layer 260 laterally extending on the passivation layer 280 are simultaneously removed by a method similar to that shown in FIGS. 1E to 1G. As a result, the passivation layer 280 is exposed, and ends 260a of the redistribution layer 260 protrude from the first surface 100a of substrate 100 and are aligned with the third surface 180a of the encapsulation layer 180. Moreover, the sidewall of the ground encapsulation layer 180 is aligned with the sidewall 140c of the conducting pad 140. A surface of the passivation layer 280 is aligned with the third surface 180a of the encapsulation layer 180. In one embodiment, the thickness of the ground encapsulation layer 180 may be approximately 3 μm to 30 μm (such as 25 μm).

Next, a protection layer 380 is formed on the third surface 180a of the encapsulation layer 180 by a deposition process to cover the ground encapsulation layer 180 and the ends 260a of the redistribution layer 260. Subsequently, after the temporary substrate (not shown) is removed, the passivation layer 280 and the protection layer 380 are diced along the scribe line (not shown) between the adjacent chip regions 120 so as to form a plurality of independent chip packages.

In this embodiment, a land grid array (LGA) serves as external conducting structures of the chip package. However, in other embodiments, the land grid array may be replaced by a ball grid array (BGA).

According to the aforementioned embodiments, a permanent support substrate 240 is provided on a side of the substrate 100 opposite to protection layer 380 (i.e., the side opposite to the sensing side of the chip package). The structural strength of the chip package is increased. As a result, layers in the chip package can be prevented from deformation due to lack of support when the sensing function of the chip package is used. Therefore, the reliability and quality of chip package can be improved. While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

Figure 4:
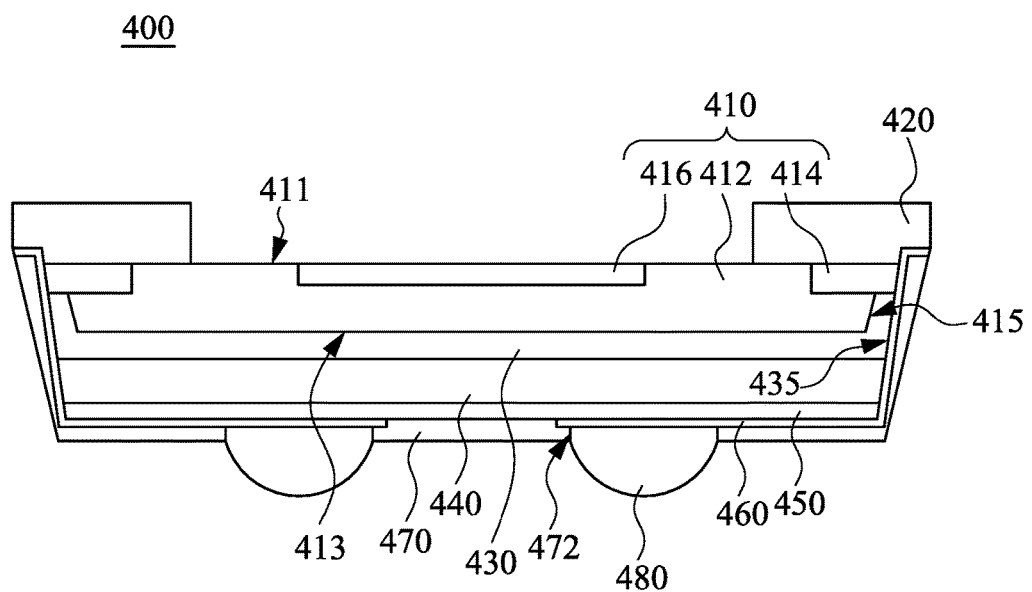
FIG. 4 is a cross-sectional view of a chip package according to one embodiment of the present invention.

FIG. 4 is a cross-sectional view of a chip package 400 according to one embodiment of the present invention. As shown in FIG. 4, the chip package 400 includes a chip 410, a dam layer 420, a permanent adhesive layer 430, a support 440, a buffer layer 450, a redistribution layer 460, a passivation layer 470, and a conducting structure 480. The chip 410 has a substrate 412, a conducting pad 414, and a sensing device 416. The substrate 412 has a side surface 415, a first surface 411, and a second surface 413 opposite to the first surface 411. The side surface 415 of the substrate 412 is connected to the first and second surfaces 411, 413. The conducting pad 414 and the sensing device 416 are located on the first surface 411, and the conducting pad 414 protrudes from the side surface 415 of the substrate 412.

The dam layer 420 is located on the first surface 411 and surrounds the sensing device 416. The permanent adhesive layer 430 covers the second surface 413, the side surface 415, and the conducting pad 414 that protrudes the side surface 415. The permanent adhesive layer 430 is between the support 440 and the substrate 412. The support 440 and the permanent adhesive layer 430 have a trench 435, such that the conducting pad 414 protruding the side surface 415 is exposed through the trench 435. The buffer layer 450 is located on the support 440.

The redistribution layer 460 is located on the buffer layer 450 and on the support 440, the permanent adhesive layer 430, and the conducting pad 414 that face the trench 435. The passivation layer 470 covers the redistribution layer 460, the buffer layer 450, and the conducting pad 414 that is exposed through the trench 435. The passivation layer 470 has an opening 472 to expose the redistribution layer 460. The conducting structure 480 is located on the redistribution layer 460 that is in the opening 472 of the passivation layer 470. Since the buffer layer 450 is between the support 440 and the redistribution layer 460, thermal expansion and contraction of the support 440 can be prevented affecting the connection between the redistribution layer 460 and the conducting structure 480.

In this embodiment, the chip package 400 may be a fingerprint sensor, but the present invention is not limited in this regard. The substrate 412 may be made of a material including silicon. The chip 410 may further include an interlayer dielectric (ILD), an inter metal dielectric (IMD), and a passivation layer. The conducting pad 414 is located in the passivation layer. The support 440 may be made of a material including glass, such that the strength of the chip package 400 may be improved. The redistribution layer 460 may be made of a material including aluminum or copper. Physical vapor deposition (PVD) method may be used to form the redistribution layer 460 to cover the buffer layer 450, the support 440, the permanent adhesive layer 430, and the conducting pad 414. Thereafter, a patterning process is performed to form the redistribution layer 460. The patterning process may include exposure, development, and etching processes in photolithography. The conducting structure 480 may be a solder ball of a ball grid array (BGA) or conductive protrusion. The dam layer 420, the buffer layer 450, and the passivation layer 470 may be made of a material including epoxy.

In the following description, a manufacturing method of a chip package will be described.

Figure 5:
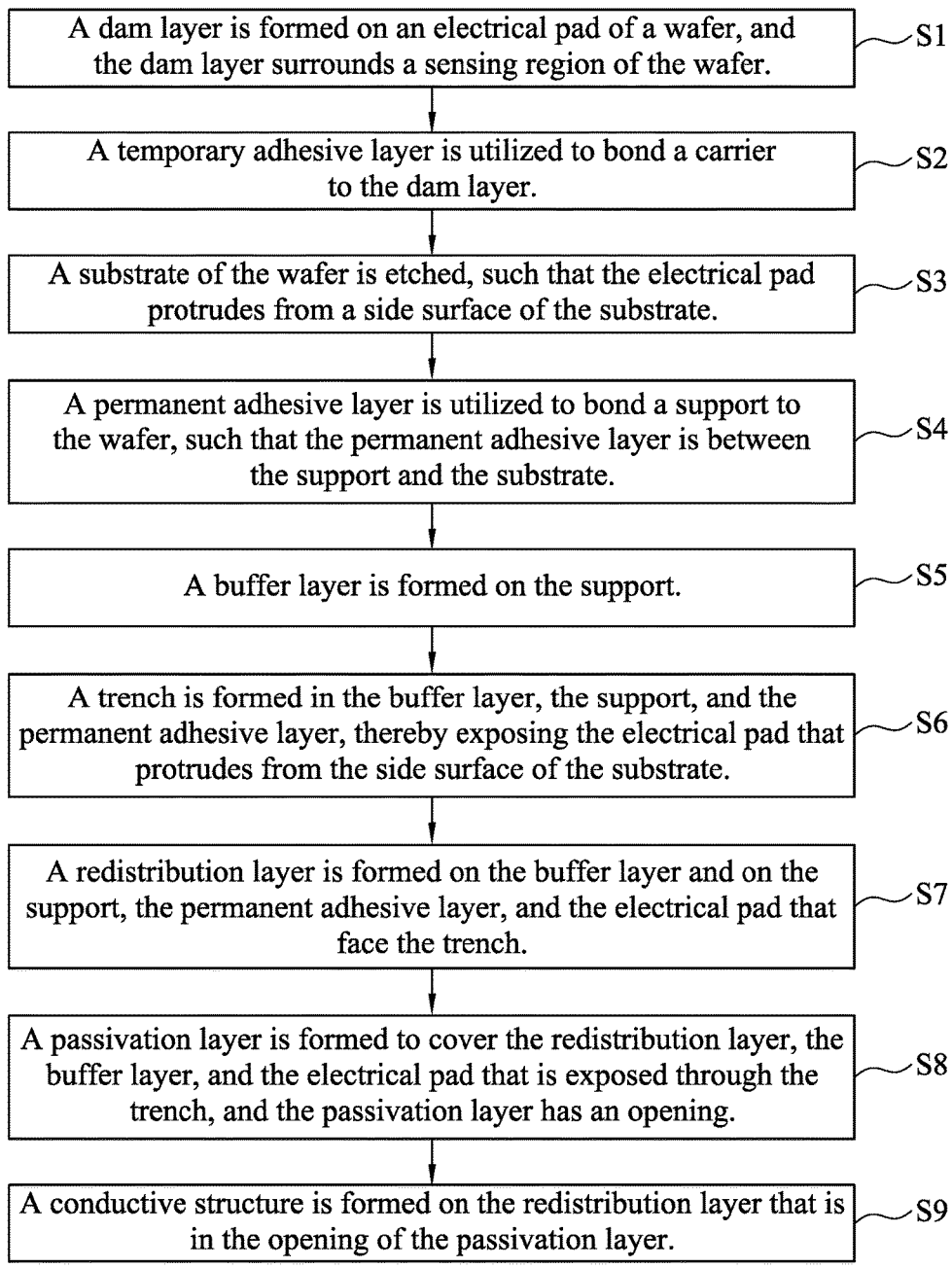
FIG. 5 is a flow chart of a manufacturing method of a chip package according to one embodiment of the present invention.

FIG. 5 is a flow chart of a manufacturing method of a chip package according to one embodiment of the present invention. The manufacturing method of the chip package includes the following steps. In step S1, a dam layer is formed on a conducting pad of a wafer, and the dam layer surrounds a sensing device of the wafer. Thereafter, in step S2, a temporary adhesive layer is utilized to bond a carrier to the dam layer. Next, in step S3, a substrate of the wafer is etched, such that the conducting pad protrudes from a side surface of the substrate. Afterwards, in step S4, a permanent adhesive layer is utilized to bond a support to the wafer, such that the permanent adhesive layer is between the support and the substrate. Subsequently, in step S5, a buffer layer is formed on the support. Thereafter, in step S6, a trench is formed in the buffer layer, the support, and the permanent adhesive layer, thereby exposing the conducting pad that protrudes from the side surface of the substrate. Next, in step S7, a redistribution layer is formed on the buffer layer and on the support, the permanent adhesive layer, and the conducting pad that face the trench. Subsequently, in step S8, a passivation layer is formed to cover the redistribution layer, the buffer layer, and the conducting pad that is exposed through the trench, and the passivation layer has an opening. Finally, in step S9, a conducting structure is formed on the redistribution layer that is in the opening of the passivation layer.

In the following description, a wafer 410a is referred to as a semiconductor structure that is not cut yet to form plural chips (e.g., the chip 410 shown in FIG. 4).

Figure 6:
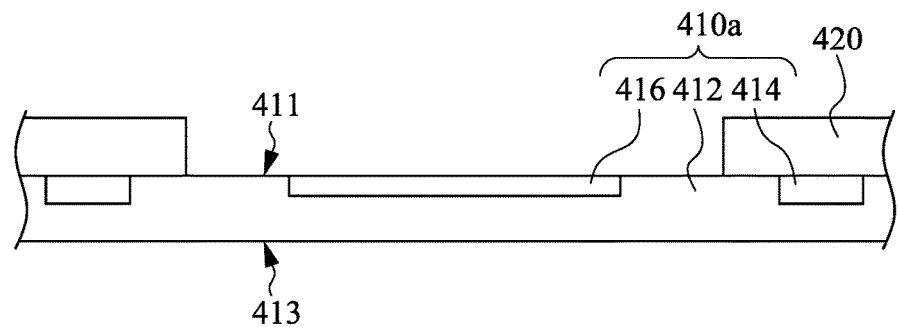
FIG. 6 is a cross-sectional view of a dam layer after being formed on a wafer according to one embodiment of the present invention.
Figure 7:
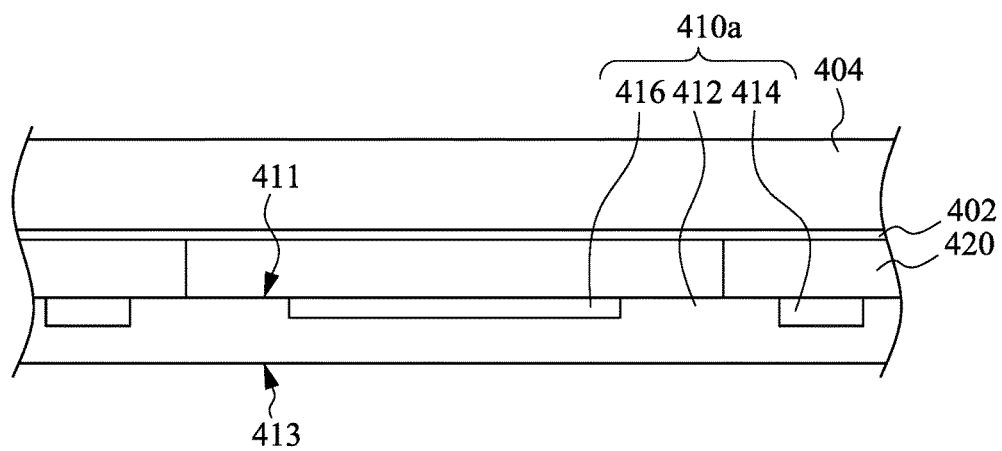
FIG. 7 is a cross-sectional view of the dam layer shown in FIG. 6 after being bonded to a carrier.

FIG. 6 is a cross-sectional view of the dam layer 420 after being formed on the wafer 410a according to one embodiment of the present invention. FIG. 7 is a cross-sectional view of the dam layer 420 shown in FIG. 6 after being bonded to a carrier 404. As shown in FIG. 6 and FIG. 7, the wafer 410a having the substrate 412, the conducting pad 414, and the sensing device 416 is provided. The dam layer 420 may be formed on the conducting pad 414. The dam layer 420 surrounds the sensing device 416. Thereafter, a temporary adhesive layer 402 is utilized to bond the carrier 404 to the dam layer 420, such that the temporary adhesive layer 402 is between the carrier 404 and the dam layer 420, and the carrier 404 covers the sensing device 416. The carrier 404 may provide the substrate 412 with a supporting force, thereby preventing the substrate 412 from being broken by a force in the subsequent manufacturing process.

Figure 8:
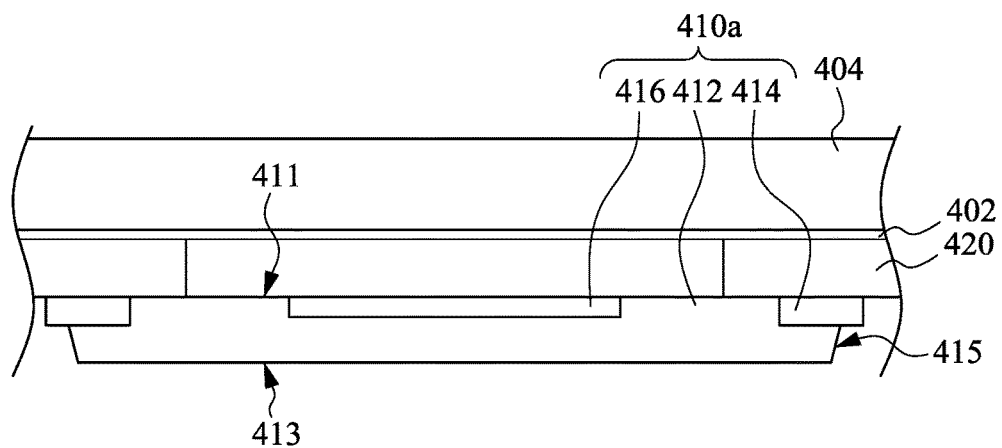
FIG. 8 is a cross-sectional view of a substrate shown in FIG. 7 after being etched.
Figure 9:
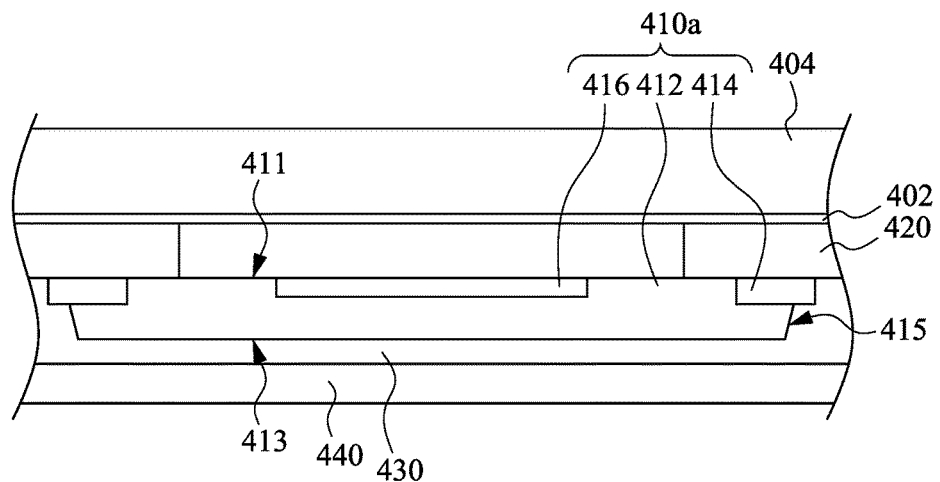
FIG. 9 is a cross-sectional view of the wafer shown in FIG. 8 after being bonded to the carrier.

FIG. 8 is a cross-sectional view of the substrate 412 shown in FIG. 7 after being etched. FIG. 9 is a cross-sectional view of the wafer 410a shown in FIG. 8 after being bonded to the carrier 404. As shown in FIG. 8 and FIG. 9, after the carrier 404 is bonded to the dam layer 420, the substrate 412 of the wafer 410a is etched, such that the conducting pad 414 protrudes from the side surface 415 of the substrate 412. Thereafter, the permanent adhesive layer 430 may be utilized to bond the support 440 to the wafer 410a, such that the permanent adhesive layer 430 is between the support 440 and the substrate 412.

Figure 10:
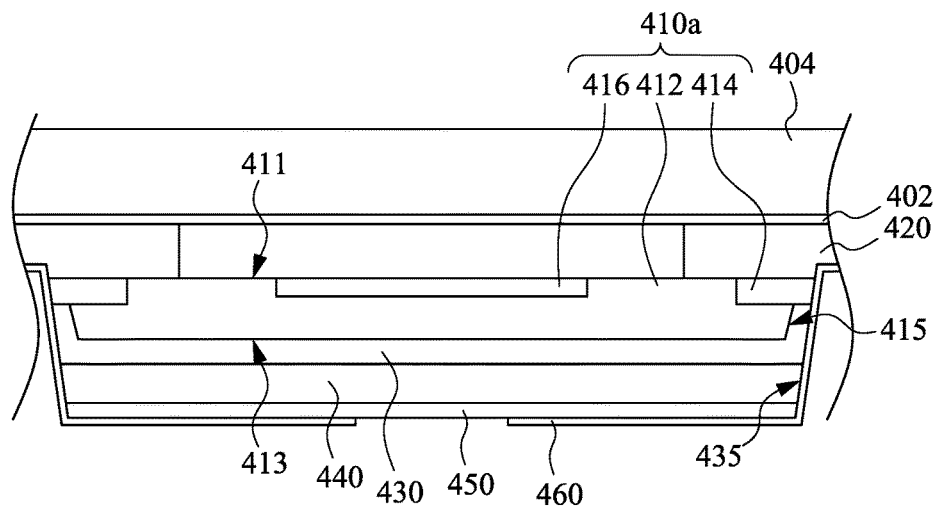
FIG. 10 is a cross-sectional view of a buffer layer and a redistribution layer after being formed on a support shown in FIG. 9.

FIG. 10 is a cross-sectional view of the buffer layer 450 and the redistribution layer 460 after being formed on the support 440 shown in FIG. 9. As shown in FIGS. 9 and 7, after the support 440 is bonded to the substrate 412, the buffer layer 450 may be formed on the support 440. Thereafter, the trench 435 may be formed in the buffer layer 450, the support 440, and the permanent adhesive layer 430 with a knife, thereby exposing the conducting pad 414 that protrudes from the side surface 415 of the substrate 412. Afterwards, the redistribution layer 460 may be formed on the buffer layer 450 and on the support 440, the permanent adhesive layer 430, and the conducting pad 414 that face the trench 435, thereby forming the structure of FIG. 10. In this embodiment, the redistribution layer 460 is electrically connected to the side surface of the conducting pad 414.

Figure 11:
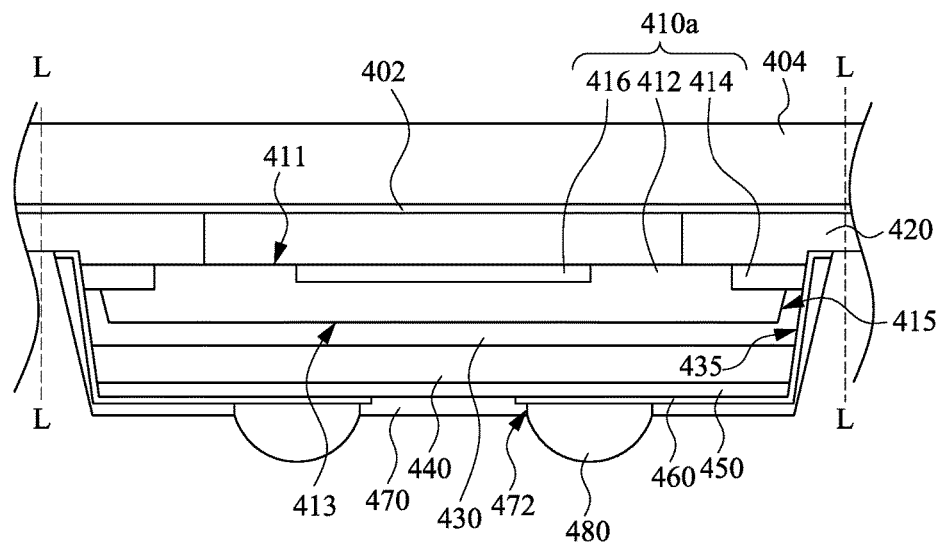
FIG. 11 is a cross-sectional view of a passivation layer and a conducting structure after being formed on the redistribution layer shown in FIG. 10.

FIG. 11 is a cross-sectional view of the passivation layer 470 and the conducting structure 480 after being formed on the redistribution layer 460 shown in FIG. 10. As shown in FIG. 10 and FIG. 11, after the redistribution layer 460 is formed, the passivation layer 470 may be formed to cover the redistribution layer 460, the buffer layer 450, and the conducting pad 414 that is exposed through the trench 435, and the passivation layer 470 may have the opening 472 through a patterning process. Thereafter, the conducting structure 480 may be formed on the redistribution layer 460 that is in the opening 472 of the passivation layer 470. As a result, the conducting structure 480 may be electrically connected to the conducting pad 414 through the redistribution layer 460. Afterwards, a knife may be used to cut the carrier 404 and the dam layer 420 along the trench 435 (i.e., along line L-L).

After the structure of FIG. 11 is cut, in one embodiment, the adhesion of the temporary adhesive layer 402 may be eliminated, and the carrier 404 is removed from the dam layer 420. For example, ultraviolet light may be utilized to irradiate the temporary adhesive layer 402 for eliminating the adhesion of the temporary adhesive layer 402, or the temporary adhesive layer 402 may be immersed in a chemical liquid for eliminating the adhesion of the temporary adhesive layer 402. After the carrier 404 is removed, the chip package 400 shown in FIG. 4 may be obtained.

Figure 12:
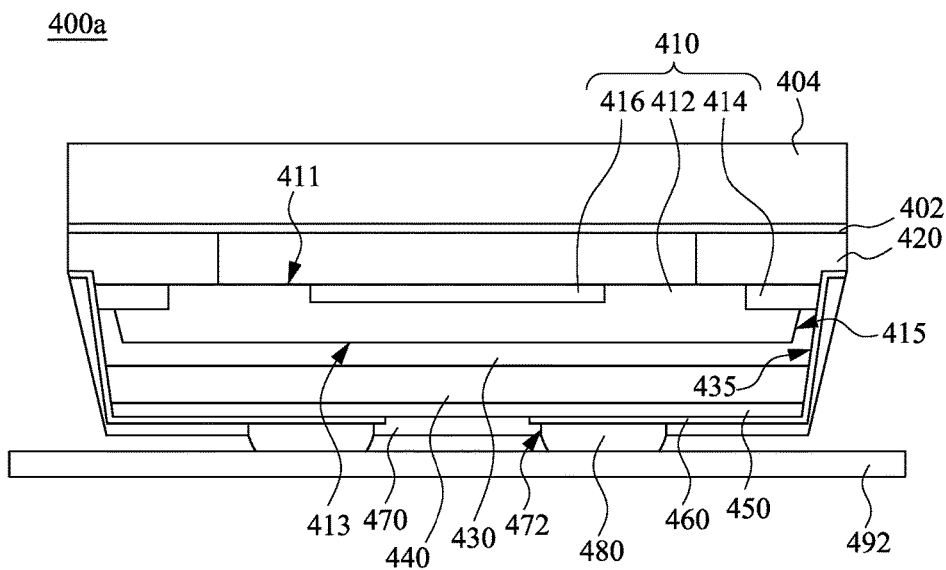
FIG. 12 is a cross-sectional view of a structure shown in FIG. 11 after being cut and disposed on a printed circuit board.

FIG. 12 is a cross-sectional view of a structure shown in FIG. 11 after being cut and disposed on a printed circuit board 492. As shown in FIG. 11 and FIG. 12, after the structure of FIG. 11 is cut, the conducting structure 480 may be electrically connected to the printed circuit board 492, thereby obtaining a chip package 400a.

Figure 13:
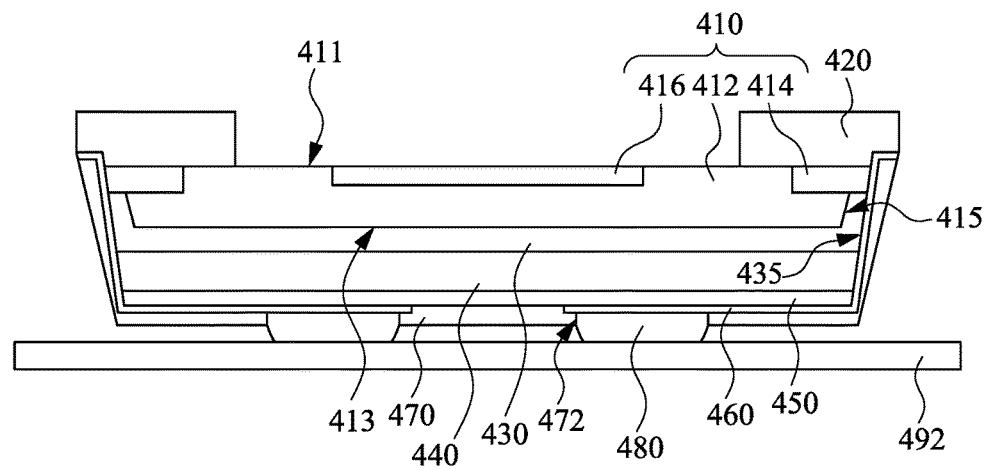
FIG. 13 is a cross-sectional view of a temporary adhesive layer and the carrier shown in FIG. 12 after being removed.

FIG. 13 is a cross-sectional view of the temporary adhesive layer 402 and the carrier 404 shown in FIG. 12 after being removed. As shown in FIG. 12 and FIG. 13, after the conducting structure 480 is electrically connected to the printed circuit board 492, the adhesion of the temporary adhesive layer 402 may be eliminated, and the carrier 404 is removed from the dam layer 420. Hence, a chip package 400b can be obtained.

Figure 14:
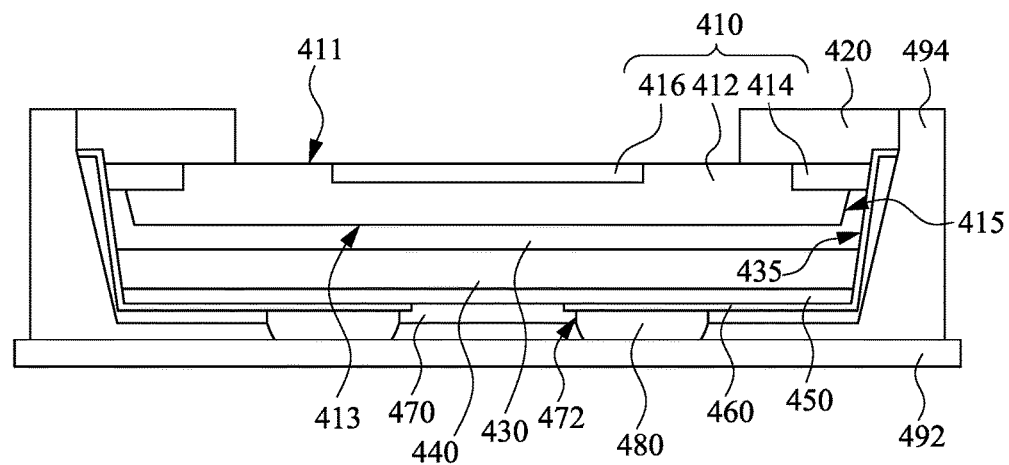
FIG. 14 is a cross-sectional view of an isolation element after being formed on the printed circuit board shown in FIG. 13.

FIG. 14 is a cross-sectional view of an isolation element 494 after being formed on the printed circuit board 492 shown in FIG. 13. As shown in FIG. 13 and FIG. 14, after the carrier 404 is removed from the dam layer 420, the isolation element 494 may be formed on the printed circuit board 492, thereby obtaining a chip package 400c. In this embodiment, the isolation element 494 surrounds the passivation layer 470 and the dam layer 420. The isolation element 494 is formed by molding.

Figure 15:
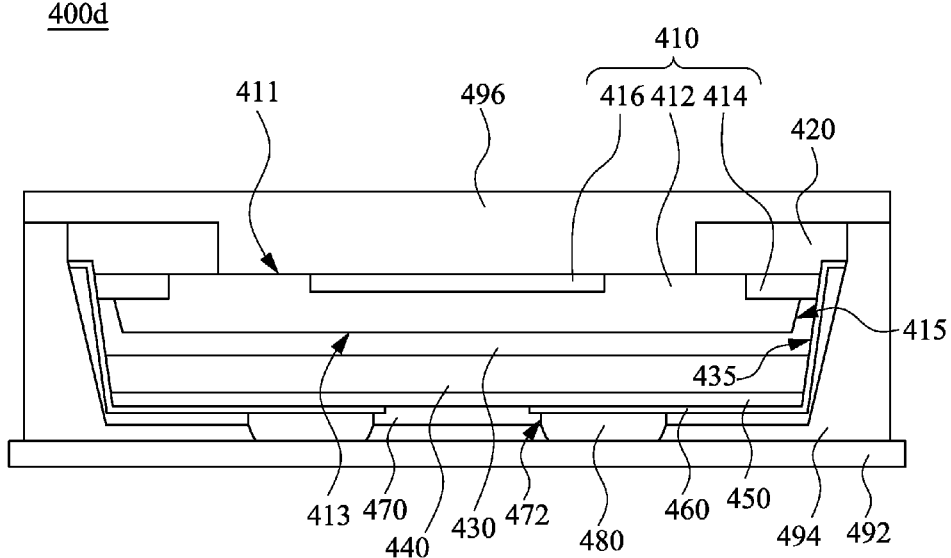
FIG. 15 is a cross-sectional view of a first dielectric layer after being formed on the isolation element and the chip shown in FIG. 14.

FIG. 15 is a cross-sectional view of a first dielectric layer 496 after being formed on the isolation element 494 and the chip 410 shown in FIG. 14. As shown in FIG. 14 and FIG. 15, after the isolation element 494 is formed, the first dielectric layer 496 may be formed on the isolation element 494 and the chip 410, thereby obtaining a chip package 400d. In this embodiment, the first dielectric layer 496 may be made of a material including titanium oxide or strontium titanate, which is high-k material. Due to the material property of the first dielectric layer 496, the capacitance of the chip package 400d can be prevented from decaying. As a result, the sensing capability of the chip package 400d for fingerprint pressure may be improved. The first dielectric layer 496 may be formed by coating, deposition, or printing.

Figure 16:
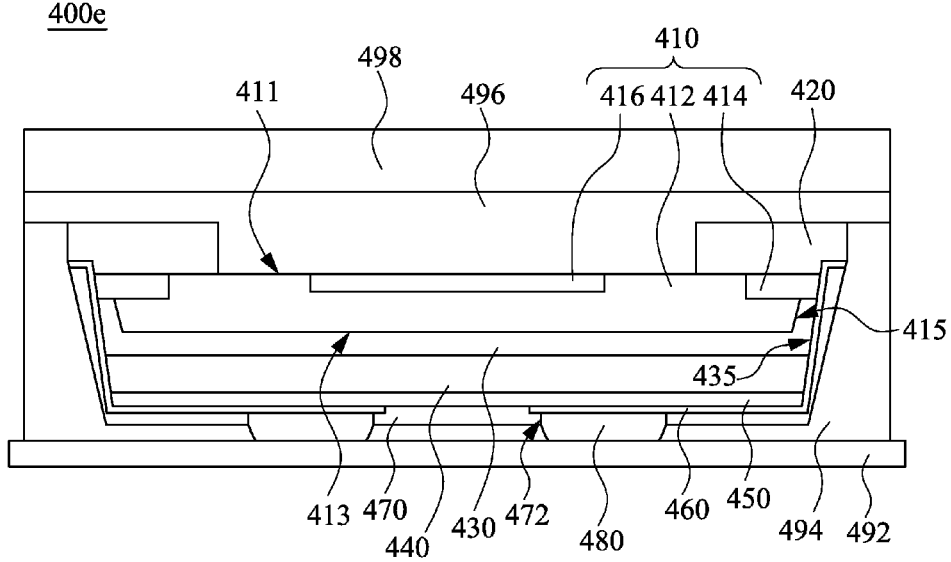
FIG. 16 is a cross-sectional view of a second dielectric layer after being formed on the first dielectric layer shown in FIG. 15.

FIG. 16 is a cross-sectional view of a second dielectric layer 498 after being formed on the first dielectric layer 496 shown in FIG. 15. As shown in FIG. 15 and FIG. 16, if the hardness of the first dielectric layer 496 is not enough, in order to prevent the sensing device 416 of the chip 410 from being damaged due to users' pressing, the second dielectric layer 498 may be formed on the first dielectric layer 496. Hence, a chip package 400e may be obtained. In this embodiment, the hardness of the second dielectric layer 498 is greater than the hardness of the first dielectric layer 496, thereby improving the strength of the chip package 400e.

Comparing the aforementioned chip packages and the prior art, the temporary adhesive layer is utilized to bond the carrier to the dam layer in manufacturing the chip package of the present invention. The carrier can provide support strength to the chip, thereby preventing the chip package from being broken and damaged in the manufacturing process. As a result, the yield rate of the chip package may be improved. In addition, since the carrier is bonded to the dam layer, a thin substrate may be selected to manufacture the chip package. Therefore, the material cost of the chip package may be reduced, and the convenience of designing the chip package may be improved. Before a cutting process for the chip package is utilized, processes performed on the wafer are with a wafer level, so that the manufacturing cost of the chip package is lower than a conventional wire-bonding process. Moreover, after the cutting process, the chip package is a chip scale package (CSP), thereby facilitating the miniaturization design of the chip package.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A chip package, comprising:
a chip having a substrate, a conducting pad, and a sensing device, wherein the substrate has a side surface, a first surface, and a second surface opposite to the first surface, and the side surface is connected to the first and second surfaces, and the conducting pad and the sensing device are located on the first surface, and the conducting pad protrudes from the side surface;
a dam layer located on the first surface and surrounding the sensing device, wherein the dam layer has a top surface facing away from the first surface, and the top surface is exposed;
a permanent adhesive layer covering the second surface, the side surface, and the conducting pad that protrudes the side surface, wherein a sidewall of the permanent adhesive layer is adjacent to a sidewall of the conducting pad;
a buffer layer, wherein the permanent adhesive layer is between the buffer layer and the substrate;
a redistribution layer located on the buffer layer and on the sidewall of the permanent adhesive layer and the sidewall of the conducting pad, and extending into the dam layer and not passing through the top surface of the dam layer;
a passivation layer covering the redistribution layer, the buffer layer, and the conducting pad, wherein the passivation layer has an opening to expose the redistribution layer; and
a conducting structure located on the redistribution layer that is in the opening of the passivation layer.
2. The chip package of claim 1, further comprising:
a printed circuit board electrically connected to the conducting structure.
3. The chip package of claim 2, further comprising:
an isolation element located on the printed circuit board and surrounding the passivation layer and the dam layer.
4. The chip package of claim 3, further comprising:
a first dielectric layer located on the isolation element and the chip.

5. The chip package of claim 4, wherein the first dielectric layer is made of a material comprising titanium oxide or strontium titanate.

6. The chip package of claim 4, further comprising:
a second dielectric layer located on the first dielectric layer, wherein hardness of the second dielectric layer is greater than hardness of the first dielectric layer.

7. The chip package of claim 1, further comprising:
a carrier located on the dam layer and covering the sensing device.

8. The chip package of claim 7, further comprising:
a temporary adhesive layer between the carrier and the dam layer.

9. A chip package, comprising:
a chip having a substrate, a conducting pad, and a sensing device, wherein the substrate has a side surface, a first surface, and a second surface opposite to the first surface, and the side surface is connected to the first and second surfaces, and the conducting pad and the sensing device are located on the first surface, and the conducting pad protrudes from the side surface;
a permanent adhesive layer covering the second surface, the side surface, and the conducting pad that protrudes the side surface;
a support, wherein the permanent adhesive layer is between the support and the substrate, and a sidewall of the permanent adhesive layer is adjacent to a sidewall of the conducting pad and a sidewall of the support;
a buffer layer located on the support;
a redistribution layer located on the buffer layer and on the sidewall of the support, the sidewall of the permanent adhesive layer, and the sidewall of the conducting pad;
a passivation layer covering the redistribution layer, the buffer layer, and the conducting pad, wherein the passivation layer has an opening to expose the redistribution layer; and
a conducting structure located on the redistribution layer that is in the opening of the passivation layer.

10. The chip package of claim 9, further comprising:
a printed circuit board electrically connected to the conducting structure.

11. The chip package of claim 10, further comprising:
an isolation element located on the printed circuit board and surrounding the passivation layer.

12. The chip package of claim 11, further comprising:
a first dielectric layer located on the isolation element and the chip.

13. The chip package of claim 12, wherein the first dielectric layer is made of a material comprising titanium oxide or strontium titanate.

14. The chip package of claim 12, further comprising:
a second dielectric layer located on the first dielectric layer, wherein hardness of the second dielectric layer is greater than hardness of the first dielectric layer.

15. The chip package of claim 9, further comprising:
a carrier covering the sensing device.

16. The chip package of claim 15, further comprising:
a temporary adhesive layer between the carrier and the chip.

* * * * *